United States Patent [19]

Hutschenreuter et al.

[11] 4,399,839
[45] Aug. 23, 1983

[54] TUBULAR CASING SUITABLE FOR SMOKED FOODSTUFFS AND PROCESS FOR MANUFACTURE AND USE THEREOF

[75] Inventors: Elfriede Hutschenreuter, Bad Schwalbach; Andrae Klaus, Zornheim, both of Fed. Rep. of Germany

[73] Assignee: Hoechst Aktiengesellschaft, Frankfurt am Main, Fed. Rep. of Germany

[21] Appl. No.: 420,949

[22] Filed: Sep. 21, 1982

[30] Foreign Application Priority Data

Oct. 3, 1981 [DE] Fed. Rep. of Germany ....... 3139481

[51] Int. Cl.³ .................... F16L 11/00; A22C 13/00
[52] U.S. Cl. ................................. 138/118.1; 138/156; 138/170; 428/36; 476/105; 476/140; 476/413
[58] Field of Search ............... 138/118.1; 428/36; 426/105, 135, 140, 412, 413, 414, 513

[56] References Cited

U.S. PATENT DOCUMENTS

| | | |
|---|---|---|
| 2,000,835 | 5/1935 | Goldberger . |
| 2,148,884 | 2/1939 | Walter . |
| 2,210,436 | 8/1940 | Weingand et al. . |
| 2,226,442 | 12/1940 | Rumsey, Jr. . |
| 2,573,956 | 11/1951 | Daniel, Jr. . |
| 2,607,696 | 8/1952 | Kunz . |
| 2,608,488 | 8/1952 | Rumsey, Jr. . |
| 2,653,432 | 9/1953 | Wright et al. . |
| 2,685,769 | 8/1954 | Conti . |
| 2,685,770 | 8/1954 | Conti . |
| 2,686,725 | 8/1954 | Cornwell . |
| 2,757,495 | 8/1956 | Reichel . |
| 2,773,773 | 12/1956 | Harder et al. . |
| 2,819,488 | 1/1958 | Gimbel . |
| 2,857,283 | 10/1958 | Firth et al. . |
| 2,926,154 | 2/1960 | Keim . |
| 2,999,788 | 9/1961 | Morgan . |
| 3,378,379 | 4/1968 | Shiner et al. . |
| 3,546,209 | 12/1970 | Lipps, Jr. . |
| 3,594,857 | 7/1971 | Michl . |
| 3,617,312 | 11/1971 | Rose . |
| 3,619,854 | 11/1971 | Ilgen et al. . |
| 3,766,603 | 10/1973 | Urbutis et al. . |
| 3,884,270 | 5/1975 | Rasmussen et al. . |
| 3,898,348 | 8/1975 | Chiu et al. . |
| 3,988,804 | 11/1976 | Regner et al. . |
| 4,185,358 | 1/1980 | Regner et al. . |
| 4,192,904 | 3/1980 | Gerigk et al. . |
| 4,207,353 | 6/1980 | Rasmussen et al. . |
| 4,233,341 | 11/1980 | Hammer et al. . |
| 4,248,900 | 2/1981 | Hammer et al., . |
| 4,283,426 | 8/1981 | Schenk et al. . |
| 4,356,199 | 10/1982 | Hammer et al. ................... 426/105 |
| 4,356,200 | 10/1982 | Hammer et al. ................... 426/105 |

FOREIGN PATENT DOCUMENTS

| | | |
|---|---|---|
| 14346 | 8/1980 | European Pat. Off. . |
| 1385394 | 12/1964 | France . |
| 865727 | 4/1961 | United Kingdom . |
| 908205 | 10/1962 | United Kingdom . |
| 1381231 | 1/1975 | United Kingdom . |
| 1584435 | 2/1981 | United Kingdom . |

*Primary Examiner*—William R. Dixon, Jr.
*Attorney, Agent, or Firm*—Schwartz, Jeffery, Schwaab, Mack, Blumenthal & Koch

[57] ABSTRACT

Disclosed is a tubular casing consisting of a cellulose web or of a fiber-reinforced cellulose web, which is curved to form a tube and the longitudinal edge regions of which are bonded by an adhesive. On the inside and/or outside of the tubular casing, there is optionally a smoke-permeable adhesion-promoting layer, in particular a layer of a heat-cured cationic resin. The smoke-permeable adhesive layer contains a condensation product, cured at room temperature, of a polyamide-polyamine, an aliphatic polyamine or a polyamide with bifunctional halohydrins or derivatives thereof, such as epichlorohydrin. Optionally, the tubular casing is shirred, preferably with helical displacement of the seam zone. Also disclosed are processes for manufacturing the tubular casing and for using it as a packaging wrap for foodstuffs, in particular as an artificial sausage casing which can be smoked.

8 Claims, 8 Drawing Figures

TUBULAR CASING SUITABLE FOR SMOKED FOODSTUFFS AND PROCESS FOR MANUFACTURE AND USE THEREOF

BACKGROUND OF THE INVENTION

The present invention relates to a tubular casing, to a process for its manufacture, and to its use. More especially, the invention relates to a tubular casing suitable for smoked foodstuffs, especially sausages.

Tubular casings of this type are made by folding a web along the longitudinal axis to form a tube and gluing the overlapping edge zones running parallel to the longitudinal axis.

According to U.S. Pat. No. 2,607,696, an edge zone of the web of regenerated cellulose is provided with an acid aqueous solution of a partially polymerized, heat-curable resin and the other edge zone of the web is then pressed together with the resin layer, a tube being formed. Subsequently, the overlapping edge zones are joined to one another at about 180° to 220° C. under the action of pressure, whereby the resin is heat-cured. Examples of resins mentioned are urea/formaldehyde resins and melamine/formaldehyde resins. According to statements in this printed publication, this tubular casing can also be used as a sausage casing for the production of small skinless sausages, with the tubular casing being peeled off from the sausage after the boiling step.

This old process, which has been known for about 30 years, is hardly used any longer. In particular, the overlapping seam obtained is not sufficiently strong. Because of the relatively low breaking strength of the seam, there is, for example, an increased risk of bursting of the sausages made with this casing. Moreover, the known tubular casing can be manufactured only by a relatively complicated method. In particular, the high temperatures during the gluing lead to an undesired loss of water and to a permanent deterioration of the physical properties of the web material, so that the tubular casing obtained is not suitable, for example, for the subsequent shirring to produce shirred sticks. On the other hand, according to this printed publication, heating to temperatures of above 180° C. is necessary after the application of adhesive, in order to obtain any bond at all between the mutually overlapping edge zones of the web. Additionally, this publication does not contain any indication to the effect that the seam region is adequately gas-permeable and smoke-permeable, which would enable these tubular casings to also be used for foodstuffs which are to be smoked.

Because of these disadvantages, tubular casings for foodstuffs, in particular artificial sausage casings, have in the meantime been manufactured predominantly from seamless material, although some disadvantages must be accepted in the case of these seamless tubular casings. In particular, this process is very cost-intensive.

Seamless tubes of fiber-reinforced regenerated cellulose are usually manufactured by the following essential process steps. A web of nonwoven fiber is formed to give the shape of a tube, the edge zones of the web overlapping and being glued with viscose. After one-sided or two-sided coating of the tube of nonwoven fiber with viscose from annular slot dies, the viscose is coagulated, regenerated to give cellulose hydrate gel and dried. Non-fiber-reinforced seamless tubes of regenerated cellulose are produced by extrusion of viscose through an annular die into the coagulation bath, and they are converted analogously into regenerated cellulose. During the coagulation and regeneration, the tube is supported by the gas mixture being formed and, during drying, it is supported by an enclosed volume of air which has been introduced. If appropriate, the tube is stretched in the longitudinal and transverse directions in order to improve its mechanical properties.

Disadvantageously, weakened zones, so-called spinning edges, which run parallel to the longitudinal axis in the edge region appear during the regeneration, for example, on the edges which result from the tube being laid flat.

Moreover, the stretching processes which are customary with seamless tubes also have disadvantages. Neither the internal pressure of the process gases evolving in the tube nor the internal pressure during drying can be controlled with sufficient accuracy, so that the diameter and the wall thickness of the seamless tubes cannot be kept constant within narrow limits, even if complicated and expensive process engineering is applied. A further disadvantage is that, when tubes are stretched by means of an expanding gas, the ratio of the stretching forces acting in the tangential and radial directions is fixed so that, for this reason, the mechanical properties of the seamless tube are also fixed, in particular the shrinking properties and the strength in the longitudinal and transverse directions.

SUMMARY OF THE INVENTION

It is therefore an object of the present invention to provide a tubular casing, optionally fiber-reinforced, of regenerated cellulose, which does not have any of the said disadvantages of the known tubular casings.

It is a particular object of the invention to provide a tubular casing having optimum mechanical properties, in particular, shrinkage values and strength values.

Another object of the invention is to provide a tubular casing wherein the gluing seam can withstand relatively high mechanical and thermal stresses, for example, elongation stresses and the action of hot water, and does not impair the flavor and appearance of the foodstuff.

Still another object of the invention resides in providing a tubular casing which is capable of being shirred by means of conventional shirring devices to produce shirred sticks.

A particularly important object is to provide a tubular casing which is adequately permeable to gas and smoke in the gluing region, while simultaneously having a high tear strength. Such a casing is envisaged for foodstuffs which are to be smoked, for example, for special cooked sausages or hard smoked sausages, the casing of which must in some cases also be capable of being peeled off, or for other foodstuffs, for example, certain types of cheese.

It is an additional object of the present invention to provide a tubular casing of regenerated cellulose, which may be fiber-reinforced and which can be manufactured in a simpler manner from a web, in particular at normal ambient temperatures and with short residence times until the adhesive has dried.

It is a further object of the invention to provide a straight, essentially curvature-free and crease-free tubular casing which has a seam and which, even under the action of water and on shrinking, retains its curvature-free and crease-free form even in the seam region, in spite of the relatively large thickness of the casing in this region.

It is also an object of the invention to provide an opening aid which enables the casing to be removed from the contents mre easily and hygienically, without weak points on the tubular casing having to be provided.

Finally, it is also an object of the invention to provide a process for producing the tubular casings according to the invention.

In accomplishing the foregoing objects, there has been provided in accordance with one aspect of the present invention a tubular casing suitable for foodstuffs, comprising a rectangular web of film, which is curved around its longitudinal axis and having its longitudinal edge regions joined by a glued seam to form a tubular casing, the tubular casing being comprised of cellulose or fiber-reinforced cellulose and having at least in the region of the glued seam an adhesive layer which contains a substantially water-insoluble cationic resin for joining the longitudinal edges, and wherein the tubular casing contains, in the region of the glued seam, a smoke-permeable adhesive layer of a room temperature-cured water-insoluble condensation product of a polyamide-polyamine, or an aliphatic polyamine or a polyamide with a bifunctional halohydrin or a halohydrin derivative. Preferably, if the tubular casing is composed of a fiber-reinforced cellulose, it comprises a smoke-permeable adhesion-promoting layer on its inside and/or outside.

In accordance with another aspect of the invention, there has been provided a process for manufacturing a tubular casing as defined above, comprising the steps of curving a piece of a web of cellulose or fiber-reinforced cellulose around its longitudinal axis, thereby shaping it into a tube; gluing the longitudinal edges of the tube to a smoke-permeable film strip overlapping both edge regions; before, during or after the formation of the tube, applying a solution which contains a still water-soluble condensation product of a polyamide-polyamine, aliphatic polyamine or polyamide with a bifunctional halohydrin to those surfaces of the web and/or of the film strip which are to be glued; and curing the condensation product by storing the resulting tube at a temperature of up to 40° C. for a period of time sufficient to convert it into the insoluble form. Optionally, the process further comprises the step of first applying a smoke-permeable adhesion-promoting layer to the web at least in the intended gluing region.

Further objects, features and advantages of the present invention will become apparent from the detailed description of preferred embodiments which follows, when considered in light of the attached figures of drawing.

BRIEF DESCRIPTION OF THE DRAWINGS

In the drawings:

FIG. 5a is a cross-sectional view through element 41 in FIG. 5;

DETAILED DESCRIPTION OF PREFERRED EMBODIMENTS

Figure 1:
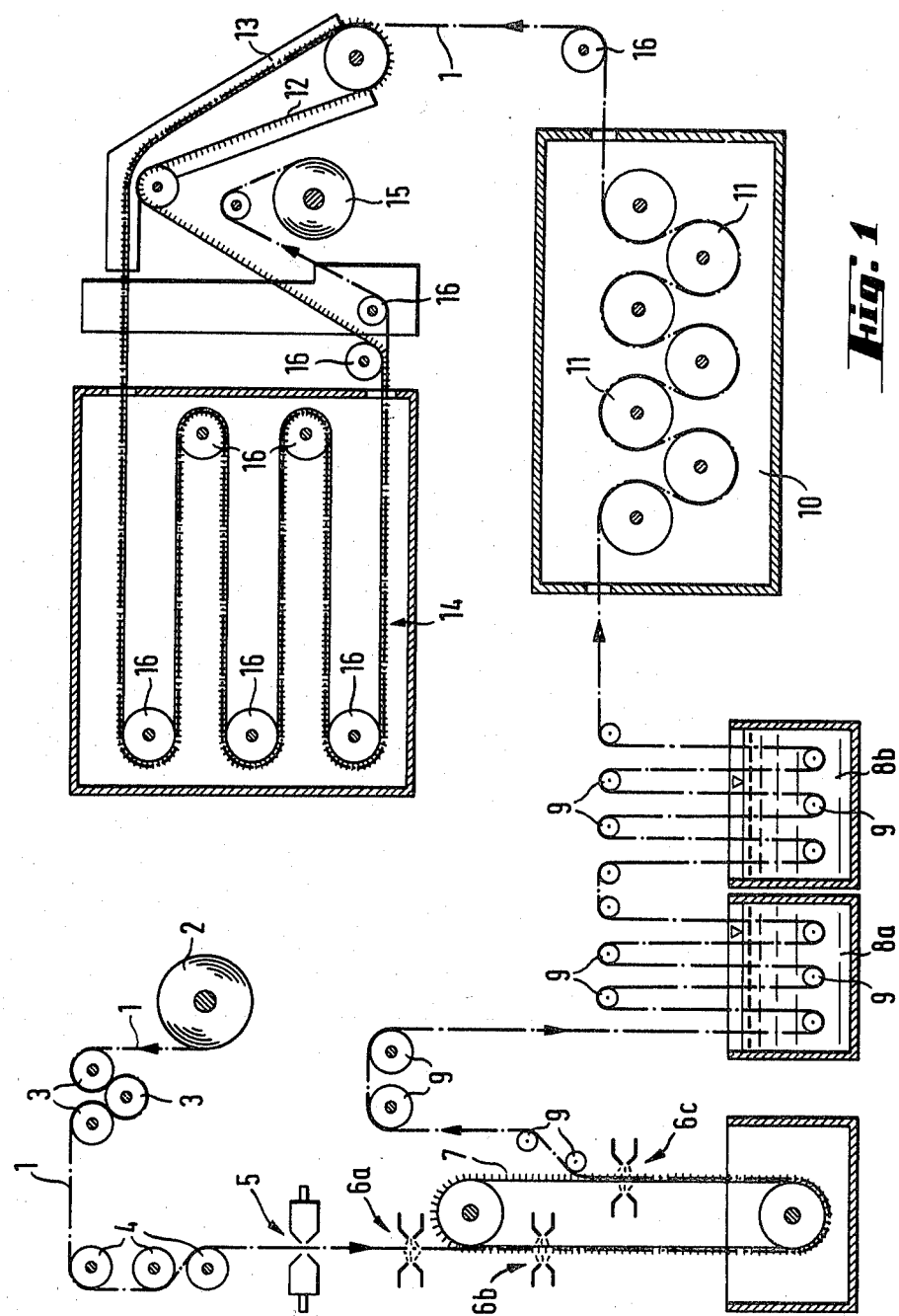
FIG. 1 schematically illustrates a process according to the invention for producing a fiber-reinforced web from regenerated cellulose having a particularly high breaking strength.

Surprisingly, the casings of the invention have the advantage that, under the action of heat and water, such as is the case, for example, when sausage casings are cooked and then cooled, they retain their straight curvature-free form. This is particularly surprising and not forseeable, since it would normally be expected that, under the action of heat and water, the casing will assume a curved shape or expand unevenly or shrink and even tend to burst, because of the different wall thicknesses in the seam region, on the one hand, and in the remaining regions, on the other hand, and because of the different values which are expected for the strength, the water absorption capacity and the water retention capacity.

The formation of a tubular casing with one seam or several seams running along the longitudinal axis by gluing the edge regions of the edge zones running along the longitudinal axis is known per se, reference being made, in this context, to the U.S. patent cited above.

According to the present invention, a sheet-like or web-like rectangular cut piece of film is used which is curved around its longitudinal axis, or a correspondingly curved film web of cellulose, for example, a continuous film web, optionally having an anchoring agent for the adhesive on its surface is used. This is converted into a tubular casing having a bonding seam running parallel to the longitudinal axis, by overlapping and gluing the edge regions which run along the longitudinal axis with a solution or dispersion containing an adhesive. For simplicity, in order to indicate "sheet-like or web-like cut pieces" and "continuous webs", only the term "webs" is used in the following text. In the overlapping region, the layer containing an adhesive is applied to the anchoring layer, if present, in the form of a solution or dispersion. It is also possible for the edge zones to be bonded to one another in such a way that the edges are brought together flush, that is to say with the edges at least essentially abutting, and are then bonded to one another by means of a tape, film strip or foil strip, which is called a "film strip" in the following text and which covers both edge zones. The film strip is then on the outside or inside of the tubular casing, or film strips which run parallel to one another are used, of which one is then on the inside and one is on the outside of the tubular casing. One or several film strips can also be used if the edge zones overlap. Immediately before the bonding seam is made, the adhesive layer in the form of a solution or a dispersion is applied to the edge zones of the web, and/or if appropriate to the surfaces of the film strip, for example, by means of a nozzle or an applicator roll.

The film strip typically has a width of from about 5 to 15 percent of the tube circumference and preferably is composed of the same material as the tubular casing, that is to say, it is composed of smoke-permeable cellulose, which may be fiber-reinforced, and the strength values of which in the longitudinal and transverse directions are within the same range as those of the tubing material. If, however, no particular importance is attached to a curvature-free form of the tubular casing, it is also possible to use a perforated, needled or punched film strip of paper or of a stretch-oriented plastic film, such as a polyester copolymer, vinylidene chloride copolymer, polyvinyl chloride film or polypropylene film, or a composite film of two or more films, for example, with an aluminum foil, or a smoke-permeable nonwoven, for example, an adhesively, mechanically or thermally consolidated nonwoven fiber web of spun fibers, filaments or multiple filament yarns of a synthetic or natural material, which have been laid down randomly or in ordered fashion, or a smoke-permeable foamed film of open-cell or closed-cell foam structure, for example, of polyurethane or polystyrene.

Smoke-permeable micro-porous films are also suitable, which are to be understood to include also membranes having a pore diameter such as that of, for example, membranes which are used in reverse osmosis, ultrafiltration, dialysis or hemofiltration, or as diaphragms in batteries or fuel cells.

Likewise, tapes of a close-mesh fabric, network or lattice, which are, for example, woven from filaments in warp and weft fashion, are also suitable as smoke-permeable film strips for bonding the edge zones. Thus, it is essential that the film strip, by virtue of its structure or its chemical composition, is capable of allowing the smoking fumes to penetrate through the bonding seam of the tubular casing. Preferably, however, compact film strips of a smoke-permeable material, in particular the above-mentioned film strip of cellulose, which may have a fiber-reinforcing, are used, and no additional smoke-permeable structure of the film strip is then necessary, for example, in the form of pores or perforations.

Surprisingly, the film strip of cellulose, which may be fiber-reinforced, having the mechanical properties indicated for the tube material, can also be used as a tear-open tab for the tube filled with a filling, in particular for sausage casings, which are to be peeled off the contents without great effort. For this purpose, small incisions are made in the sausage casing immediately to the right and left next to the film strip, for example, after the sausage has been initially cut, so that the film strip and the part of the casing bonded thereto form a kind of gripping tab. When this gripping tab is pulled, the sausage casing tears in the direction of the longitudinal axis, on the right and left next to the film strip.

The forming of the web to give a tube is carried out, for example, either on a sufficiently long path, so that distortion and formation of creases do not occur, or by deflecton over a shoulder-like forming tool. After the tube has been formed, the two lateral edges of the web adjoin one another substantially without a gap, or they overlap. By means of transport elements gripping the tube circumference, the tube is moved over the surface of a support body located in the interior of the tube. The film strip, if used, is introduced before the seam is closed, preferably with its adhesive layer facing in the direction of the inner surface of the tube, located in such a way between the surface of the support body and the abutting edges of the web that the butt seam formed by the edges of the web forms approximately the center line of the film strip, which covers both edge zones to substantially the same width. Bonding can be effected by contact with a roll, whereby pressure may additionally be exerted on the bonding area. If desired, it is also possible to apply slight heating, in which case the bonding area is kept below 40° C., as far as possible. However, an application of pressure and a supply of heat are usually avoided, since they can lead to an undesired change, in particular embrittlement and drying-out of the web material. Excess adhesive solution can be removed from the seam region, for example, by means of a roll with a sponge-like surface or by means of scrapers. Usually, however, the water absorption capacity (swelling value) of the web material is sufficient to absorb excess aqueous solvent or dispersing agent. The web movement and bonding can take place cyclically or continuously. It is particularly surprising and not forseeable that the combination, according to the invention, of adhesive and web material as well as anchoring agent, if used, leads to rapid drying of the adhesive layer, preferably even at room temperature. Room temperature is to be understood as temperatures between about 15° and 30° C. This effect has the further advantage that the resulting tubular casings can already be wound up 1 to 3 seconds after the formation of the seam, without the seam sliding about. After a storage period of about 1 to 3 days at a temperature of up to about 40° C., preferably at room temperature, the adhesive is fully cured and the seam can then be subjected to greater loads, such as occur, for example, in the production of sausages.

Base materials used for the production of the tubular casing are webs of cellulose, that is to say of transparent cellulose film, regenerated cellulose or cellulose hydrate, which may have been reinforced with a fiber insert, such as are customary for the packaging of foodstuffs, in particular as a sausage casing material. Thus, cellulose webs which have been manufactured by the viscose process (U.S. Pat. No. 3,884,270), by denitration of cellulose nitrate or by hydrolysis of other cellulose esters, for example, deacetylation of cellulose acetate, with an aqueous or alcoholic alkali solution (U.S. Pat. No. 3,546,209) can be employed. For simplicity, only cellulose webs will be mentioned below. The manufacture of cellulose webs is known and will be described in the following text only by way of example.

The fiber reinforcement is preferably in the form of a web, for example, a paper web, and usually it is composed of fibers such as are used in the manufacture of paper or rice paper, or of natural fibers, such as hemp or flax fibers, or synthetic fibers, such as polyamide, polyester or polyacrylonitrile fibers. An example of a fiber reinforcement is a textile structure, such as a nonwoven fiber web.

The fiber web is preferably treated on both sides with a viscose solution, in particular it is immersed in a viscose solution or coated with a viscose solution, and the viscose is then converted into regenerated cellulose. It is also possible to incorporate reinforcing fibers into the viscose. The fiber-containing viscose is then extruded through a die into the coagulation bath to form a gel web. If the web material used is regenerated cellulose which is not fiber-reinforced the viscose is extruded directly through a die into the coagulation bath.

As is known, the viscose solution is an alkaline solution of sodium cellulose-xanthate. After ripening, the viscose is applied to the fiber web and/or directly spun, that is to say coagulated. The spinning bath contains, for example, sulfuric acid, and also sodium sulfate and/or ammonium sulfate.

After coagulation, the web-like product which is composed of viscose gel and may be fiber-reinforced is regenerated in an acid medium to give cellulose hydrate gel which is washed with water to remove acid and salts, desulfurized, optionally passed through a bleaching bath, and finally passed through a softening bath containing, for example, aqueous 5 to 20 percent glycerol solution.

In the present case, the web of cellulose hydrate gel is optionally treated before drying with a solution or dispersion containing the anchoring agent, and drying is carried out at temperatures between about 65° and 140° C., in particular at from about 80° to 110° C. The resulting web of regenerated cellulose is adjusted to a water content of from about 4 to 15, in particular from about 7 to 10, percent by weight by conditioning. After drying, the cellulose hydrate webs have a softener content of from about 7 to 25 percent by weight, and a thickness of from about 20 to 50 μm, preferably from about 25 to 30 μm, corresponding to a weight per unit area of from about 30 to 75 g/m², and the thickness of the fiber-reinforced cellulose hydrate webs is from about 50 to 200 μm corresponding to a weight per unit area of from about 50 to 250 g/m².

In a particularly preferred embodiment, the cellulose web has high values of breaking strength and elongation at break, as will be described below. To produce a fiber-reinforced cellulose web having these values, the fiber web is, for example, held by the edges, so that shrinking of the web is prevented, in particular during the regeneration of the viscose and subsequently until the final drying process, but in some cases also even during the coating with viscose. The holding of the fiber web is effected, for example, by means of needle rollers, needle belts or needle chains which are formed in a single row or in several rows. These grip the two edges of the fiber web, so that the width of the web is kept constant during the entire process. The number of punctures in the edge zones is to be kept as small as possible, in order to minimize the reduction in the strength of the web. On the other hand, a sufficient number of punctures must be present in order to ensure adequate prevention of shrinkage. Chains of gripping clips or a cord-type guide of an acid- and alkali-resistant material, for example, of an appropriate plastic, can be used for holding the edges of the fiber web. In the case of a cord-type guide, the fiber web is held on both edges by means of one cord in each case, the edge being laid around this cord and being fixed by gluing or fusion under the action of heat, or by means of an adhesive. This cord runs, for example, in a guide rail. So-called full-width drawing rollers can also be used for keeping the web broad.

To produce a fiber-reinforced cellulose web of high breaking strength, the web of cellulose hydrate gel is, for example, prevented from shrinking during the drying process and at the same time stretched additionally in the transverse direction, preferably by about 5 to 15 percent, in particular from about 7 to 12 percent, relative to the original width of the fiber web. If a slight shrinkage of the web in the transverse direction has occurred during the regeneration, the extent of transverse stretching during drying is correspondingly increased. Before this stretching, predrying is carried out, if necessary, during which the major part of the water is removed until the web of cellulose hydrate gel has a water content of from about 80 to 150 percent by weight.

In this preferred embodiment, more extensive stretching transversely to the direction of the web is not carried out, and an actual longitudinal stretching step is likewise omitted. The shrinkage of the web in the longitudinal direction, which occurs during the process, in particular on coagulation, regeneration and drying, is compensated above all by the tensile force which is exerted on the web in the longitudinal direction and which is required in order to pull the web through the individual treatment stages.

The strength values of the web in the longitudinal and transverse directions, which are reached due to the shrinkage-preventing measures and the transverse stretching during the drying process, are particularly advantageous for the production of the fiber-reinforced tubular casing with a longitudinal seam and for the film strip which is composed of the same material and is to be used for the bonding of the edge zones of the web.

Cellulose webs without a fiber reinforcement and having a high breaking strength and elongation at break are obtained by longitudinal and/or transverse stretching before and/or during the drying stage. Processes of this type are known.

The breaking strength and elongation at break are measured by means of an electronic breaking apparatus according to DIN 53,455. The breaking strength is to be understood as the resistance of the specimen to tensile stress at the moment of breaking. It is measured as the breaking force (N), relative to the cross section (mm²). The elongation at break is the percentage elongation of the specimen, as compared with the original length, under stress at the moment of breaking. It is given in percent.

In the case of the fiber-reinforced cellulose web, the specimen has, in the conditioned state, a length of 100 mm, a width of 15 mm and a thickness of 100 to 110 μm. The specimen of cellulose which is not fiber-reinforced has a length of 100 mm, a width of 15 mm and a thickness of about 25 to 30 μm.

In the case of a wet specimen of the web material which is not fiber-reinforced, that is to say a specimen which has been soaked in water at about 20° C. for 30 minutes, the breaking strength in the longitudinal direction is from about 15 to 30 N/mm², in particular from about 20 to 25 N/mm², and the elongation at break is from about 40 to 60 percent, in particular from about 50 to 55 percent. The breaking strength in the transverse direction is equal to but preferably greater than the breaking strength in the longitudinal direction, and it has values of from about 15 to 30 N/mm², in particular from about 20 to 30 N/mm². The elongation at break in the transverse direction is within the range of values from about 100 to 160 percent, in particular from about 145 to 155 percent.

In the case of a dried specimen of non-fiber-reinforced web material having a residual moisture content of from about 8 to 10 percent by weight of water and from about 15 to 21 percent by weight of glycerol, the breaking strength in the longitudinal direction is from about 70 to 140 N/mm², in particular from about 110 to 120 N/mm², and the elongation is from about 10 to 28 percent, in particular from about 16 to 22 percent. The breaking strength in the transverse direction has a value of from about 70 to 90 N/mm², in particular from about 75 to 85 N/mm². The elongation at break of the dried specimen in the transverse direction is from about 50 to 80 percent, in particular from about 60 to 65 percent.

In the case of a wet specimen of the fiber-reinforced web material, that is to say a specimen which has been soaked in water at 20° C. for 30 minutes, the breaking strength in the longitudinal direction is from about 15 to 30 N/mm$^2$, in particular from about 20 to 30 N/mm$^2$, and the elongation at break is from about 30 to 50 percent, in particular from about 30 to 40 percent. The breaking strength in the transverse direction is equal to but preferably greater than the breaking strength in the longitudinal direction, and it has a value of between about 15 and 35 N/mm$^2$, in particular from about 25 to 35 N/mm$^2$. The elongation at break in the transverse direction is in the same range of values as that in the longitudinal direction, that is to say it is from about 30 to 50 percent, in particular from about 30 to 40 percent.

In the case of a dried specimen of the fiber-reinforced material, having a residual moisture content of about 8 to 10 percent by weight of water and about 20 to 21 percent by weight of glycerol, the breaking strength in the longitudinal direction is from about 50 to 70 N/mm$^2$, in particular from about 55 to 65 N/mm$^2$, and the elongation at break is from about 10 to 22 percent, in particular from about 12 to 15 percent. The breaking strength in the transverse direction is equal to but preferably greater than the breaking strength in the longitudinal direction, and it has a value between about 50 and 75 N/mm$^2$, in particular from about 65 to 75 N/mm$^2$. The elongation at break of the desired specimen is from about 8 to 19 percent, in particular from about 8 to 12 percent.

For the use of the cellulose material as a base material for artificial sausage casings, the values measured in the transverse direction are of particular importance, since the forces emanating from the filling act in that direction.

As is known, adhesion-promoters for the adhesives are to be understood as substances or substance mixtures which are applied to one or both of the gluing surfaces before application of the adhesive, in order to improve the adhesion between the adhesive and the gluing surfaces. In the present case, the optionally used adhesion-promoter has the object of anchoring the adhesive layer on the web and/or film strip in a wet-resistant manner, particularly if these are composed of fiber-reinforced material. If material which is not fiber-reinforced is used for the web and the film strip, it is preferable not to use an adhesion-promoter. In the following text, the adhesion-promoter is called an adhesion-promoting resin or anchoring agent. The anchoring agent is located between the adhesive layer and the web surface or between the adhesive layer and the surface of the film strip, and it is preferably a water-insoluble, heat-cured, cationic resin. Polyurethane resins, nitrocellulose and other compounds known as water-insoluble anchoring agents can likewise be used.

Although in principle the anchoring agent would have to be present only in the region of the surfaces of the continuous web which are to be glued, it is expedient for technical reasons to provide the entire area of one surface, and for certain applications or overlapping gluings even both surfaces of the web, with one or two different adhesion-promoting layers of resin.

In addition, on the surface which later forms the inside of the tubular casing, the web can also have a conventional agent for improving the ease of peeling off the tubular casing. Such tubular casings are used for the production of small skinless sausages. The tubular casing is detached from the sausage by hand or by means of a peeling machine, after an integral skin of the small sausage has formed. These agents include, for example, water-soluble proteins, such as gelatin, egg albumin and glutenin, and in particular cellulose derivatives, such as cellulose ethers and cellulose esters, silicone oils and mineral oils, and fatty acid glycerides. A suitable internal coating comprises, for example, a cellulose ether, a cationic, heat-curable resin and mineral oils (U.S. Pat. No. 4,207,353), a natural oil, a triglyceride mixture, a chemically modified starch, a partially saponified polyvinyl alcohol and microcrystalline cellulose (U.S. Pat. No. 4,248,900), and emulsified mineral oil and an acetylated fatty acid monoglyceride (British Pat. No. 1,381,231), a cellulose ether, an animal or vegetable oil, a mineral oil, a silicone oil and a water-soluble adduct of an alkylene oxide with a fatty acid partial ester (U.S. Pat. No. 3,898,348). This coating composition, which promotes the ease of detaching the casing, is applied by introducing a coating fluid into the tubular casing in the customary way or by spraying the coating into the tubular casing. In the latter case, for example, the aqueous coating composition is sprayed onto the inner surface of the tubular casing through the hollow mandrel during the shirring process. If the coating composition is to be applied to the web even before the formation of the tube, the edge regions of the web which are to be bonded must remain free from this coating. For this purpose, the coating solution is applied by means of an appropriately wide application device, for example, by means of a roller, either leaving the edge zones free or coating the full area, in which case the edge zones are then freed from the coating solution, for example, by means of a blade.

Preferably, the web of coagulated, but not yet dried cellulose hydrate gel is coated with a solution or dispersion which contains up to about 10 percent, in particular from about 0.1 to 0.5 percent by weight of an anchoring agent, in particular of a dispersible, heat-curable cationic resin. In the case of fiber-reinforced webs, the preferred concentration is from about 1 to 5 percent by weight. During the customary drying of the cellulose web at temperatures from about 65° to 140° C., in particular from about 80° to 110° C., during which the moisture content of the cellulose web is reduced to values of about 4 to 15 percent, in particular of about 7 to 10 percent by weight, the cationic resin is at least partially polymerized and thus transformed into its water-insoluble heat-cured form. After the heat-curing, the resin is permanently bonded to the surface of the web. Advantageously, the process conditions are selected such that the resulting layer thickness of the anchoring agent after drying corresponds to a weight per unit area of about 0.3 to 1.5 g/m$^2$ in the case of a fiber-reinforced cellulose web, and to a lower weight per unit area of about 0.01 to 0.1 g/m$^2$ in the case of a cellulose web which is not fiber-reinforced. This is adequate for webs of this type.

The anchoring agent is applied before, simultaneously with or after the treatment of the web of cellulose hydrate gel with a customary softener, for example, a polyol, such as glycerol. Although it is also possible to apply the anchoring agent only after the drying of the cellulose web, this has the disadvantage that an additional drying stage is necessary for removing the solvent or dispersing agent and, if appropriate, curing the cationic resin.

Lower aliphatic or aromatic hydrocarbons, lower alcohols or esters or mixtures of these solvents can be employed as suitable solvents for the anchoring agent, in particular the heat-curable resin, and also for the adhesive. Advantageously, however, an aqueous solution or dispersion is used.

If desired for certain applications, an additional water-repellant resin, such as paraffin, montan wax or carnauba wax, and/or suitable thickeners, such as cellulose ethers or starch, are applied to the web together with the anchoring agent.

The coating of anchoring agent contains, for example, an organic dye which may be transparent and which imparts an appropriate color to the tubular casing.

After the application of the anchoring agent and after drying, and before gluing, the web can be printed with labelings or decorative patterns. In addition to the printing processes customary in the manufacture of seamless sausage casings, other printing possibilities are also available since, in the present case, the flat web can be printed before shaping of the tube, instead of after forming the tube.

Optionally, in addition to the anchoring agent, the layer on the tubular casing in the region of the bonding seam may contain pigments, a plasticizer for the anchoring agent and/or a curing agent for the anchoring agent. The anchoring agent and the plasticizer are taken up in a suitable liquid solvent or dispersing agent, which advantageously can be evaporated off at a temperature at which at least pre-curing of the resin can start at the same time.

Examples which may be mentioned of a heat-curable cationic resin, preferred as the anchoring agent, are: urea/formaldehyde, melamine/formaldehyde and phenol/formaldehyde resins. Preferred plascitizers for these heat-curable resins are soft, non-curing resins of the alkyd type, or dibutyl phthalate, tricresyl phosphates or dibutyl sebacate.

Curing agents which can be employed for heat-curable resin are, for example, ammonium thiocyanate, toluenesulfonic acid, maleic acid or lactic acid. These compounds act as catalysts in the curing of the heat-curable resins. In a preferred embodiment, the curing takes place in an alkaline aqueous solution.

Particularly preferred heat-curable resins are described in U.S. Pat. No. 3,378,379. These are condensation products of a polyamide-polyamine or aliphatic polyamines or of polyamides with bifunctional halohydrins or derivatives thereof, such as, for example, epichlorohydrin, such as are also known from U.S. Pat. Nos. 2,573,956, and 2,926,154 and British Pat. Nos. 865,727 and 908,205. A particularly suitable resin is, for example, the reaction product of an aliphatic 2,6-polyamide, diethylenetriamine and epichlorohydrin.

It is known that the coloration of smoked products is produced by a reaction of phenols and carboxyl compounds with proteins, the intensity and durability of the coloring depending especially on the water content of the casing, on the pH value of the substrate and on the duration and severity of heating. The volatile carboxylic acids which represent the main constituent in the smoke and which are particularly responsible for the coloration, must therefore be able to pass through the tubular casing and its coating layers.

As already described above, it has surprisingly been found that the anchoring agent composed of the heat-cured cationic resin forms a layer which has an adequate permeability to smoke. This property is of particular importance, since the tubular casing is intended for foodstuffs which are to be smoked, for example, as an artificial sausage casing for cooked sausages. If the smoke permeability were unduly low, the typical reddish-brown color shade of the smoked sausage meat would not be obtained.

If, however, the layer of the anchoring agent is composed of a material which is not adequately smoke-permeable, this layer must be provided with a smoke-permeable structure. For this purpose, the anchoring agent is, for example, not applied to the web or film strip over the entire area, but with interruptions or blank areas. The anchoring agent can also be applied in strips, spirally or in the form of a dot screen, for example, by means of a profile roller which provides this layer with a structure. The application roller can also have a textile structure or a brush surface. It is also possible to extrude the anchoring agent onto the moving web from several nozzles which move to and fro transversely to the web to produce a wavy pattern of strips of the anchoring agent layer.

Of particular advantage is an application of a dispersion or solution containing the anchoring agent in a regular dot screen or line screen structure by rotary screen printing or gravure printing. This can be carried out at a speed of up to about 100 m/minute. Suitable passages can also be produced by chemical means, for example, by partially dissolving away the anchoring agent before the glued seam is formed.

It is furthermore possible to incorporate into the layer of anchoring agent a pulverent substance, which can be subsequently extracted, for example, starch, polystyrene, sugar or a salt. This substance is dissolved out after the anchoring agent has been applied and after the dispersing agent or solvent has been removed. It is also possible to admix a smoke-permeable additive to the anchoring agent, for example, a porous substance or organic pigments having a high permeability to smoke or gas. The permeability to gas and smoke can also be improved by an addition of gases or of agents which on heating form gas in the form of small bubbles which may expand under the action of heat. This layer is, for example, sprayed on.

It has been surprisingly found that the described embodiments of the tubular casing with good permeability to smoke of the layer of anchoring agent are adequately stable and can be stressed mechanically and thermally.

The adhesive envisaged according to the invention is a cationic resin which, initially in the water-soluble form, is applied in a solution or dispersion, advantageously in a wet layer thickness within a range of about 2 to 20 $\mu$m, in particular from about 3 to 10 $\mu$m, to the edge zones of the cellulose web, which are to be bonded to one another, immediately before or during the formation of the tube. If a film strip is used for bonding the edge zones of the cellulose web, the solution or dispersion is applied to the film strip and/or to the edge zones of the cellulose web. Adhesive is applied to both sides of the film strip, if the film strip is arranged in the overlap between the edge zones of the cellulose web.

An organic solvent or dispersing agent or a mixture is used for the adhesive, and preferably the adhesive is applied in aqueous solution of from about 5 to 20 percent by weight strength, in particular from about 10 to 15 percent by weight strength. For simplicity, only the expression "adhesive solution" will be used in the following text.

The adhesive solution can contain a dye, such as, for example, a pigment (Novofil, made by Hoechst), and if appropriate a polyol, such as glycerol, and/or a dispersing agent for the dye. The color-coded seam zone is used, for example, for identifying the bore of the tubular casing for further processing.

In a preferred embodiment, the resins are cured in the alkaline range, for example, by adding concentrated ammonia solution, and at room temperature.

The preparation of the cationic resins suitable as the adhesive is described in U.S. Pat. No. 3,378,379. The adhesives are condensation products of aliphatic polyamines or of polyamides, in particular of a polyamide-polyamine, with bifunctional halohydrins or derivatives thereof, such as, for example, epichlorohydrin, such as are also described, for example, in U.S. Pat. Nos. 2,926,154 and 2,573,956 or in British Pat. Nos. 865,727 and 908,205. The reaction product of an aliphatic 2,6-polyamide, diethylenetriamine and epichlorohydrin is a particularly suitable resin.

Possible polyamines are simple alkylene-diamines or polyalkylene-polyamines, such as, for example, diethylenetriamine, triethylenetetramine, tetraethylenepentamine and the corresponding polypropylene-polyamines and polybutylene-polyamines, such as dibutylenetriamine. To prepare the corresponding chlorohydrin resins, the polyamines are reacted with more than one mole of epichlorohydrin per mole of polyamine. In general, from about 1.5 to 4.0 moles of epichlorohydrin, in most cases from about 2 to 3 moles, are employed. The reaction is carried out in aqueous solution at moderately elevated temperatures (about 50° C.), until the desired degree of viscosity is reached. Reaction products of epichlorohydrin with dipropylenetriamine or with bis-(3-aminopropyl)-methylamine are preferably used, from about 2.8 to 3.8 moles of epichlorohydrin being reacted with 1 mole of polyamine.

The polyamide-polyamines are condensation products of a saturated, aliphatic, dibasic acid which has 3 to 8 carbon atoms in the molecule and one of the above-mentioned polyamines which has at least one secondary and two primary amino groups, such as, for example, the polyalkylene-polyamines mentioned above. It is also possible to use mixtures of these dibasic acids.

The total width of the adhesive solution applied depends on the desired strength values and the circumference of the tubular casing as well as the wet layer thickness of the adhesive solution applied. Usually, the total width of the adhesive applied will be between about 1 and 15 mm, in particular between about 2 and 3 mm, and is only a few percent of the later circumference of the tubular casing. If a film strip is used for an overlapping joint of a butt seam formed by the edge zones, application of the adhesive solution to twice the width is correspondingly necessary.

It is self-evident that, in contrast to the optional coating of the web with the anchoring agent, the adhesive solution cannot be applied over the entire area of the web, but only within the desired gluing region, that is to say along the two edges running parallel to the longitudinal axis and/or on the surface of the film strip.

During the application of the adhesive solution, that surface of the cellulose web which is to be provided with the adhesive solution is in the dried or re-moistened state and, if appropriate, already carries the above-described layer of an anchoring agent.

After the adhesive solution has been applied, for example by means of rollers or spray nozzles, the bonding seam is formed by overlapping the edge zones of the cellulose web or by overlapping the film strip with the edge zones of the cellulose web. The solvent or dispersing agent can be removed by careful heating with hot air or infrared radiators. Preferably, however, heating is not used, since it can lead to embrittlement of the cellulose material. Preferably, the solvent or dispering agent is removed, and the resin is also cured, by the subsequent storage at room temperature for a period of about 1 to 3 days. Due to the curing of the resin, which takes place during storage, the overlapping edge zones of the cellulose web are bonded to one another, or the film strip is bonded to the edge zones. A layer thickness of adhesive, corresponding to a weight per unit area within the range from about 0.2 to 10 $g/m^2$ is in general adequate. The usual thickness of the adhesive layer corresponds to a weight per unit area from about 0.3 to 3 $g/m^2$ with a total width of the adhesive layer of about 1 to 15 mm. After storage, the tubular casing has a moisture content of from about 4 to 15 percent, in particular from about 7 to 10 percent by weight.

It is really surprising that it is not necessary to exert any pressure or to apply heat to the seam area during the overlapping of the edge zones with one another or with the film strip. The combination of adhesive and web material and, if appropriate, anchoring agent, makes extremely rapid adhesion in the gluing area possible, so that the tube formed can already be wound up 1 to 3 seconds after the overlapping.

The adhesive layer and/or the anchoring agent layer can also contain further additives, for example agents to protect this layer or the tubular casing from attack by micro-organisms, wetting agents, softeners such as glycerol, fillers such as kaolin, glass beads, chalk, quartz powder, micro-dolomite, barite, fine-grained sand, zinc oxide and pigments as well as organic and inorganic dyes, for example, in the form of powder or flakes.

Moreover, the tubular casing has the advantage that the adhesive, optionally in combination with one of the above-mentioned anchoring agents, forms an adequately strong seam when webs are bonded with a formation of tubular casings. Particularly in the production of sausages, when the seam is subjected to hot water for a prolonged period during the cooking of the sausage, and during shirring, filling, twisting off, tying, clipping and the like, and the seam must withstand a high mechanical load and stresses, changes in dimensions occur. Under these circumstances, it has been found that this combination of cellulose web and adhesive, as well as anchoring agent if appropriate, is especially advantageous. It has been found that the breaking strength of glued areas has the same values as, or even higher values than those of the breaking strength of the cellulose material in the transverse direction.

For packaging meat products in the form of sausage meat, shirred seamless tubular casings are used, as is known, which progressively unfold as the sausage meat is forced in. These shirred casings, also called hollow sticks in the trade, have hitherto been manufactured from long seamless tubes which are conveyed in the direction of their longitudinal axis and are shirred against an opposing force. The length of the shirred casing usually is only 1 to 3 percent of the original length.

The tubular casing according to the invention can also be shirred. This is particularly surprising since, because of the thickening in the region of the glued seam, in particular if a film strip covering both edges is used, difficulties were really to be expected during shirring. The tubular casing is shirred, for example, by the process known from U.S. Pat. No. 3,988,804 and No. 4,185,358, and by means of the equipment described therein.

In a prefered embodiment, the shirred tubular casing shows a helical twisting and, consequently, twisting of the relatively thick seam zone about the longitudinal axis of the casing. This is effected, for example, by shirring devices known per se, such as are described, for example, in U.S. Pat. No. 2,819,488, No. 3,619,854, No. 3,594,857 and No. 3,766,603. The number of turns per 10 m of tube length is then between about 0.5 and 10.

The shirred tubes are filled with sausage meat of the cooked sausage type (about 20 m/minute), mechanically twisted off, tied or clipped, smoked, cooked at 70° to 85° C. and cooled with water. This gives sausages with a uniform shape and a casing which can be peeled off and lies close against the sausage meat. Examples of sausages of the cooked sausage type are lightly smoked sausage, smoked ham sausage, firm pork sausage, yellow-skin sausage, mortadella and Lyon sausage.

If the tubular casing is intended for sensitive foodstuffs or is to be stored with a high water content, the web or the tubular casing is sterilized. For example, heat treatment or ozone treatment, high-frequency irradiation or treatment with chemical agents, such as propylene glycol (British Pat. No. 1,584,435) or sorbate solution (U.S. Pat. No. 3,617,312), are used for this purpose.

In addition to the advantages already mentioned, it should also be pointed out that the tubular casings of the invention can be produced at a higher speed than hitherto. In the case of the manufacture of webs instead of seamless tubes from regenerated cellulose by the viscose process, the spinning process can be carried out more rapidly, as can the coating of the webs and the printing. In addition, the casing has a regular and uniform coagulated and regenerated layer of cellulose.

In addition to flexographic printing, high-grade gravure printing is also possible. Furthermore, the cut piece or the web can be printed with an all-around print or with a front and back print. In the use as a sausage casing, the flavor of the sausage meat is not affected. The sausage casing and the glued seam show high strength under elongation stresses and volume stability during filling with sausage meat, handling and processing. Surprisingly, the pressure arising on filling and the swelling and shrinking forces occurring during cooking and cooling do not cause any damage to the seam, even though the layer of the anchoring agent may have a porous structure. The sausage casing can also be stored at low temperatures and can easily be cut open, for which purpose the film strip can be used as a tear-open tab. The particular advantage is that the tubular casing is smoke-permeable even in the seam region, in spite of the adhesive layer. For example, the tubular casings filled with cooked sausage meat show after smoking a uniform, typically reddish-brown smoked color.

The invention is explained in more detail by reference to the non-limiting examples which follow.

EXAMPLE 1

Viscose was extruded through a gap into an acid coagulation bath. The web of cellulose hydrate gel was then passed through a softener bath composed of a 9 percent aqueous glycerol solution. A separate transverse stretching of the web during manufacture was not carried out.

After drying at 90 up to a maximum of 110° C., the resulting web of regenerated cellulose had a weight per unit area of 40 g/m$^2$, a water content of about 8 percent by weight and a glycerol content of about 20 percent by weight. If necessary, the water content is adjusted by remoistening. The cellulose web obtained had a permeability to water vapor of about 700 g/m$^2$,24 hours (DIN 53, 122, determined gravimetrically), and the swelling value after 24 hours at room temperature was about 140 percent. The swelling value is that quantity of water which, in percent by weight relative to the cellulose web, can be absorbed by the web material. The swelling value was determined by a method which is described in "Faerberei und textiltechnische Untersuchungen [Dyeing and textile-technological investigations]" (page 400), H. Agster, Springer-Verlag, Berlin 1956. Moreover, the web material had a breaking strength of 75 to 85 N/mm$^2$ in the transverse direction.

The cellulose web was cut into 60 mm wide tapes. Each cut piece in the form of tape was coated along one of its edges with a 12 percent by weight aqueous solution (ph 7.5, adjusted with concentrated ammonia solution) of a water-soluble cationic resin in strips in the longitudinal direction of the tape. The resin is a reaction product of ethylenediamine, adipic acid, diethylenetriamine and epichlorohydrin and is commercially available at a 12 and 20 percent by weight aqueous solution, under the name Resamin HW 601 (manufacturer Cassella).

For this purpose, the solution was transferred by means of a rotating, about 2 mm wide applicator roll from a supply trough to the running film tape, the coating assuming a width of 2 to 3 mm with a wet layer thickness of 10 to 12 μm. By means of shaping aids, gripping on the outside and inside, the tape which was coated close to the edges was formed into a tube having a diameter of 17 mm in such a way that the edge coated with the solution and the uncoated edge overlap by about 5 mm. The regions close to the edge formed in each case an overlapped glued seam running in the longitudinal direction, the result being an adhesive layer corresponding to a weight per unit area of 1 to 2 g/m$^2$. About 1 to 2 seconds after the formation of the overlapping seam, the tube formed was laid flat and wound up.

After storage at room temperature for about 3 days, the glued area had a hot-water resistance of several hours, when test specimens of 15 mm width and 50 mm clamping length which were cut transversely to the seam were immersed in suspension into hot water at 80° C. and loaded at the lower end with a weight of 500 g.

Tubular casings conditioned in a standard reference atmosphere (23° C., 50 percent relative humidity) had a breaking strength in the transverse direction of 50 N/mm$^2$ and a bursting pressure of more than 1 bar; tubes immersed for 30 minutes in water (20° C.) had a bursting pressure of 0.35 to 0.45 bar. These values are adequate for small-diameter sausage casings.

The tubular casings thus produced were shirred with the device known from U.S. Pat. No. 4,185,358 and were used as casings for sausage meat. For this purpose, the tubular casings were stuffed with typical sausage filings, for example, of the Vienna or Frankfurt type, cut into portions, and smoked and cooked under known conditions. This gave small cooked sausages having a uniformm typical red-brown smoked color. The glued seam withstood the forces arising during the processing.

If required, the tubular casing can be peeled off the sausage meat. Small sausages without a casing remain in a well-formed integral skin.

EXAMPLE 2

Example 1 was repeated, but with the difference that the adhesive used for the glued seam was a 12 percent by weight aqueous solution (pH 9) of a cationic polyamide resin available from Hercules under the name Kymmene 557 H. The solution was delivered from a pressurized stock vessel through thin tubing to a coating nozzle, the orifice of which had a diameter of about 0.4 mm and which was positioned in the region of the forming head in such a way that the adhesive solution was released directly into the overlap region of the cellulose tape laid into the form of a tube. By selecting a suitable pressure, an approximately 1 to 3 mm wide track of the adhesive solution could be produced continuously in the overlap region, this track bonding the edge regions of the tape with an overlap. The tubing obtained was immediately laid flat and wound up.

After storage at room temperature for 2 to 3 days, a hot-water resistance of several hours had developed when test specimens, cut transversely to the seam, of 15 mm width and 50 mm clamping length were immersed by suspension into hot water of 80° C. and were loaded at their lower end with a weight of 600 g. The tubular casings produced in this way are outstandingly suitable as artificial sausage casings which are smoke-permeable and resistant to breaking, in particular for sausage meat of the type mentioned in Example 1.

EXAMPLE 3

A web of long-fibered hemp paper having a width of 235 mm and a weight per unit area of 21 g/m$^2$ was coated on both sides with viscose. The gap width was, for example, 0.8 mm and the web speed was 5 m/min.

A fluid suitable for precipitation and regeneration was then applied to the web provided with viscose. The web width was kept constant by means of holding elements gripping the two web edges, so that the shrinkage which usually occurs on regeneration in the transverse direction, was prevented. The fiber-reinforced web of cellulose hydrate gel then passed through washing and desulfurization baths. The web of cellulose hydrate gel then had a width of 210 mm.

The fiber-reinforced web of cellulose hydrate gel was drawn through a trough which contained a 3 percent by weight aqueous solution of the cationic resin used in Example 1. Subsequently, the web passed through a bath containing 15 percent by weight aqueous glycerol solution.

This was followed by a pre-drying of the web, during which the water content of the web was lowered to 80 to 150 percent by weight. Subsequently, the web edges were gripped by holding elements, the web being extended in the transverse direction to a width of 252 to 262 mm. While still being kept at this width, the web was dried, preferably at about 80° to 110° C. The residual moisture content of the wound-up web was about 14 percent by weight, and it showed a breaking strength of 52 N/mm$^2$ in the longitudinal direction and of 58 N/mm$^2$ in the transverse direction, and an elongation at break of about 17.5 percent in both directions. Its weight per unit area was about 100 g/m$^2$, and its glycerol content was about 21 percent. Layers of the cured, water-insoluble resin, each having a weight per unit area of about 0.5 to 1 g/m$^2$, were present on both surfaces. The permeability to water vapor was 650 g/m$^2$.24 hours.

The maximum absorption of liquid water at room temperature after 24 hours (swelling value) was 140 percent.

The web of fiber-reinforced regenerated cellulose was cut into tapes of 170 mm width. Such a tape was passed through a forming device, a tube of 50 mm diameter formed and the two edges of the tape overlapping by 13 mm. The tip of a fine nozzle protruded into this overlap, a 12 percent aqueous solution of the resin mentioned in Example 1, adjusted to a pH value of 7.5 with concentrated ammonia, being injected under pressure through this nozzle. The about 10 mm wide layer of adhesive solution, now present in the overlap region and having a wet layer thickness of about 10 μm, mutually bonded the regions of the tape, close to the edges. The tube continuously formed and provided with a glued seam running in the longitudinal direction was immediately laid flat and wound up, without the overlap edge zones sliding about.

After storage for 2 days in a standard reference atmosphere, the glued seam had a hot-water resistance of more than 1 hour, when test strips of 50 mm clamping length and 15 mm width, cut transversely to the seam, were immersed in suspension into hot water of 80° C. and were loaded with a weight of 2,000 g. After soaking with water for 30 minutes in a water bath, the tube had a bursting pressure of 1.2 bar.

In the tensile test, conditioned samples cut transversely to the seam had a breaking strength of 57 to 58 N/mm$^2$ in the transverse direction, that is to say they reached the original strength of the material also in the region of the seam.

The tubes obtained were shirred, for example, by means of the shirring device known from U.S. Pat. No. 4,185,358.

Sections of the tubes produced in the examples were filled by means of a customary sausage-filling device with a sausage meat for cooked sausages (for example, Lyon sausage or lightly smoked sausage) under a filling pressure of 0.3 bar and were closed by tying or clipping. Subsequently, the sausages obtained were smoked in the conventional manner, for example, in moist smoke at 70° to 80° C. for 10 to 60 minutes, and cooked for a further 50 minutes in water of 80° to 82° C., and were then cooled and stored in the cold chamber. In the case of salami fillings, the sausages were smoked and dried.

After initial cutting, the sausage casings could be peeled off without effort. Moreover, even in the seam region, the sausages showed a uniform smoked coloration. The glued seam was stable to the mechanical and thermal stresses during processing and storage.

The invention is also explained in more detail by reference to FIGS. 1 to 7.

In FIG. 1, the fiber web 1 is unwound from a roll 2 and, after passing through drawing rollers 3 and rollers 4 controlling the web edges, the web is coated on both sides with viscose by means of a flat web coater 5. The fluid intended for precipitation and regeneration is sprayed from nozzles 6a, 6b and 6c onto the web 1 impregnated with viscose. During regeneration, the web width is kept constant by means of the needle chains 7 engaging on the two edges of the web, so that shrinkage of the web in the transverse direction is prevented. The fiber-reinforced web of cellulose hydrate gel passes over rollers through the trough 8a which is shown only diagrammatically and is meant to represent several washing, desulfurisation and softening baths. In the trough 8b, the web is coated with an aqueous solution of an anchoring agent. Pre-drying of the web takes place in the drying section 10 in which the web runs over drying rollers 11. Subsequently, the web edges are gripped by needle clip chains 12, and the web is passed through a tenter frame 13 and then through several decks of a drying field 14. In the tenter frame 13, the web is stretched in the transverse direction and dried, with the web width being maintained. The dried web is wound up on the roll 15 or is further processed continuously with the formation of a tube. Further rollers 16 are used in most cases for deflecting the web and/or the clip chains.

Figure 2:
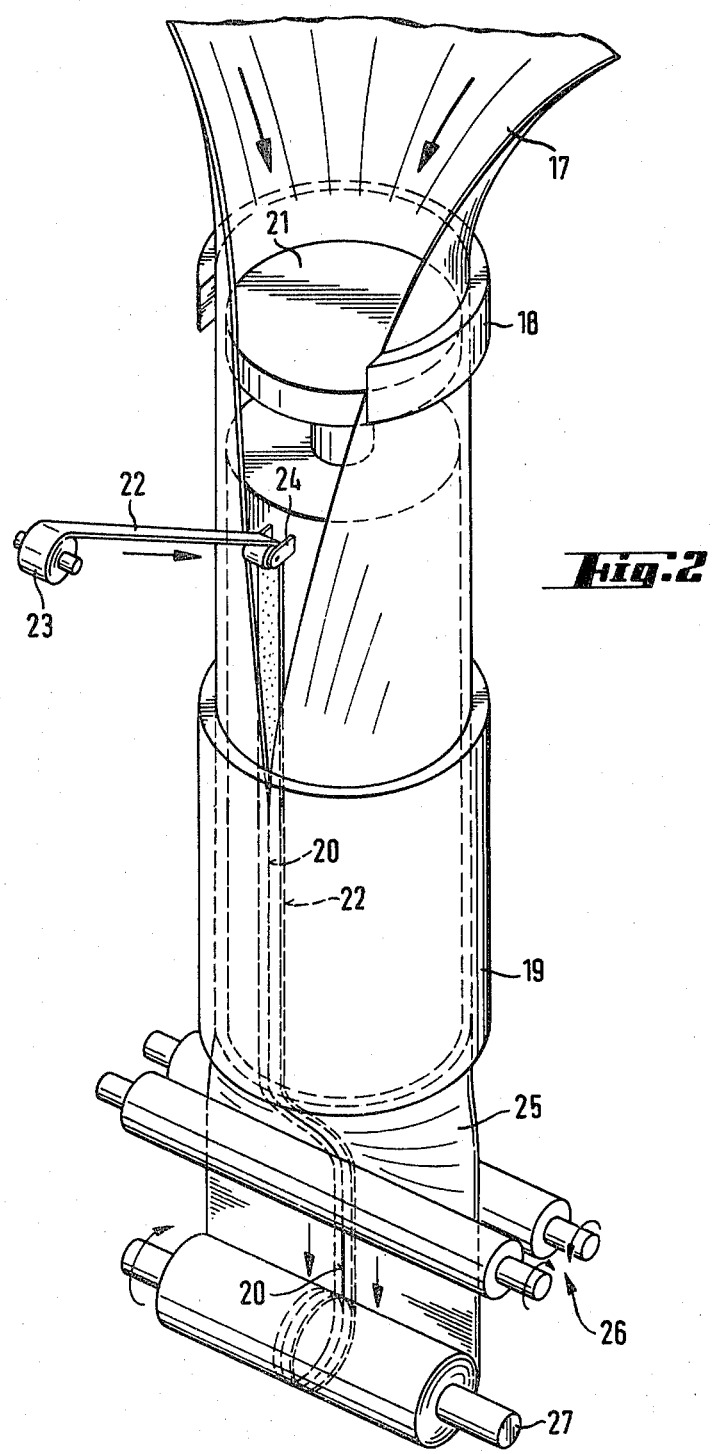
FIG. 2 is a detail perspective view illustrating a possibility of producing a tube from a web with the use of a supporting element, a guide sleeve and a film strip.

In FIG. 2, the web 17 of cellulose is passed through a ring segment 18 and shaped into a tube, the two edges approaching one another in the guide sleeve 19 to give a butt seam 20. The ring segment 18 and the guide sleeve 19 serve to assist the formation of the tube from the outside, while the cylindrical support element 21 located in the interior of the tube supports the tube from the inside. A film strip 22, composed of the same material as the web, is unwound from the roll 23 and passed via an eye-type holder 24 into the interior of the tube, the butt seam 20 being located approximately in the center of the film strip 22. To join the two edges of the web, an aqueous solution of the adhesive is present on the surface of the film strip. The aqueous solution of the adhesive is applied continuously to the film strip 22 by means of, for example, a spreader blade, nozzle or applicator roll, which is not shown.

If appropriate, a layer of the aqueous adhesive solution is also present on that surface of the web which forms the inside of the tube. The tube 25 is drawn off by the pair of rollers 26 and wound up on the roll 27.

In place of the support element 21 in the interior of the tube formed, it is also possible for a filling, for example sausage meat, to be present in the tube, which filling issues from a filling pipe of a filling apparatus at the same rate as that of the forward movement of the tube. Preferably, the filling pipe ends coaxially in the interior of the tube. Moreover, it is also possible to design the support element 21 as a filling pipe. In these cases, the formation of the tube takes place in one and the same working step as the production of the sausages. This process variant is feasible only for those types of sausage, for example, minced meat sausage, which are not cooked immediately after filling.

Figure 3:
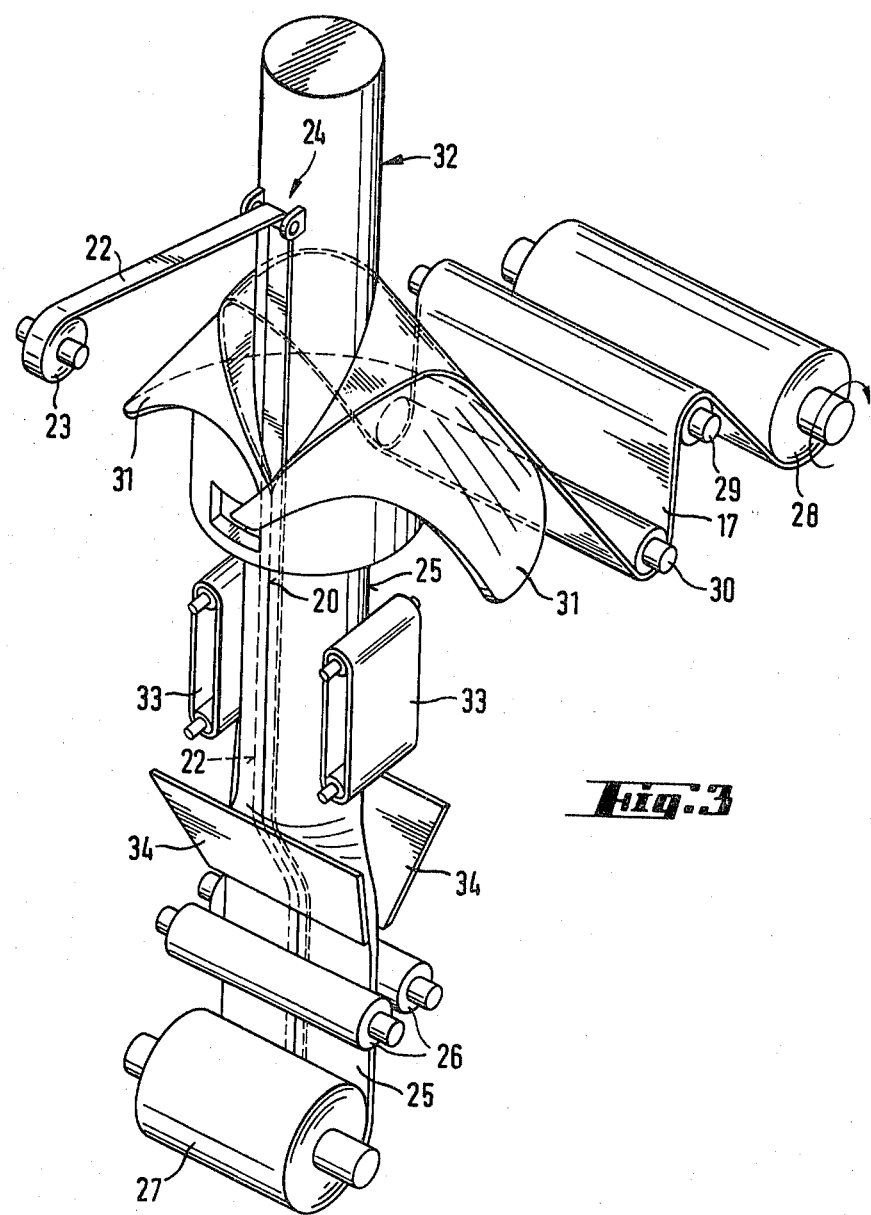
FIG. 3 is another detail perspective view illustrating a further alternative for producing a tube from a web, with the use of a forming shoulder and a film strip.

In an alternative shown in FIG. 3, the web 17 of cellulose is drawn off the roll 28 and passed over guide rollers 29 and 30 to a forming shoulder 31, where the tube is formed. The two edges of the web 17 approach one another with the formation of a butt seam 20. The cylindrical support element 32 is located in the interior of the tube 25 and has an external diameter which corresponds to the internal diameter of the tube 25 which is formed.

A film strip 22 composed of the web material is unwound from the roll 23 and passed over an eye-type guide element 24 into the interior of the tube 25, the butt seam 20 being located in the center of the film strip 22. The film strip 22 has been coated with an aqueous adhesive solution. It has, for example, a width of 10 mm, so that the edge zones of the web are in each case covered for about 5 mm.

On the outer surface of the tube 25, transport belts 33 push the tube 25 downwardly. The tube 25 passes baffles 34, which lay the tube flat, and a pair of transport rollers 26, and the tube is then wound up on the roll 27. In place of the baffles 34, it is also possible to use guide rollers or other devices, such as are customary, for example, for the gradual fold-free laying flat of extruded plastic tubes.

Figure 4:
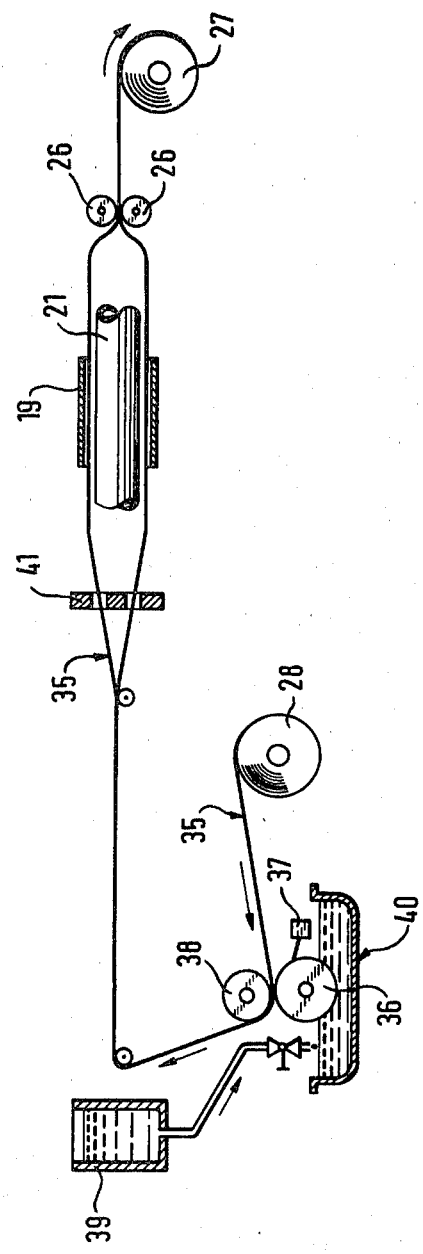
FIG. 4 schematically illustrates a further variant of tube production wherein an overlap seam is formed by means of a forming template.

In FIG. 4, the application of the aqueous adhesive solution to the web is shown.

From the stock roll 28, a web 35 of cellulose is passed into an applicator unit which comprises an applicator roll 36, a doctor blade 37 and counter-roll 38. The applicator roll 36 causes the adhesive solution to be applied in strips to an edge zone of the web 35. The adhesive solution is delivered from the stock vessel 39 into the trough 40. By means of the forming template 41, the support tube 21 and the contact sleeve 19, the web 35 is shaped into a tube with an overlapped longitudinal seam, and the tube is laid flat by the pair of draw-off rollers 26 and conveyed to the winding-up device 27.

Figure 5:
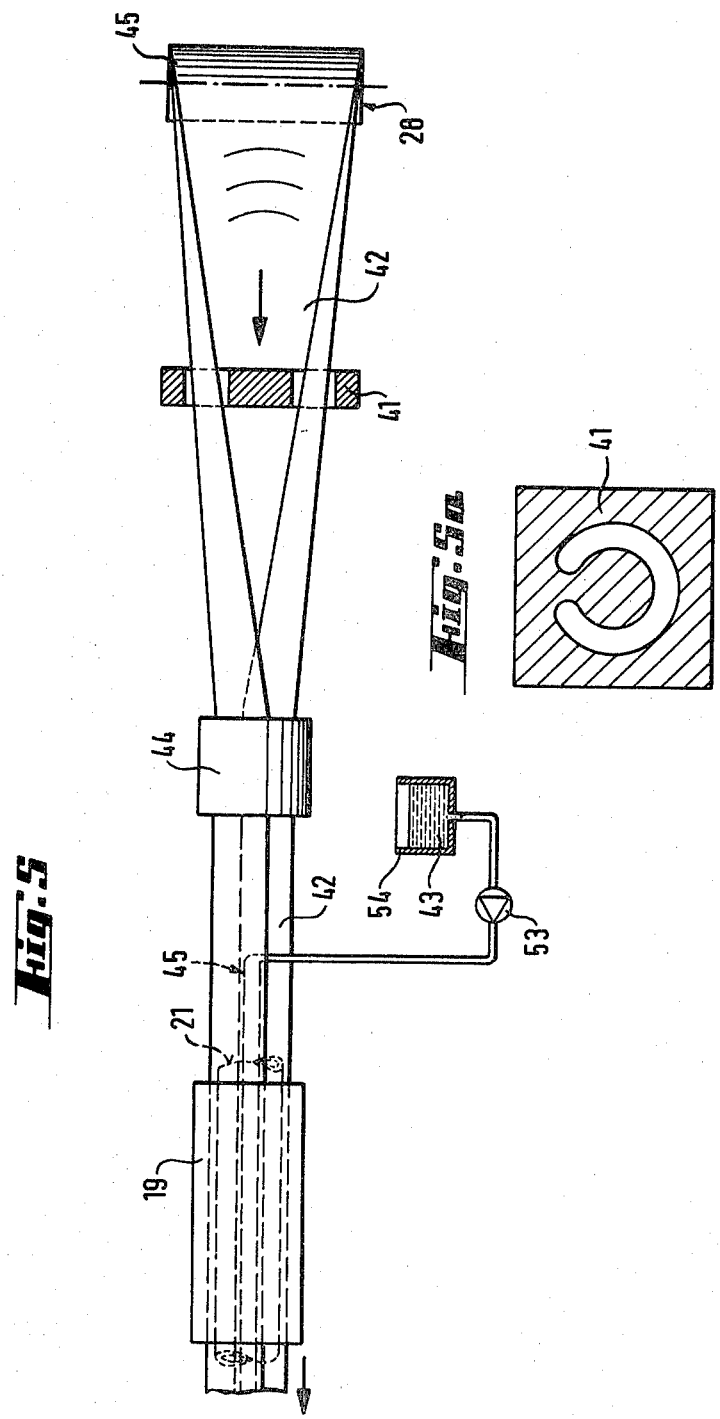
FIG. 5 is a schematic side view illustrating a possible way of forming a tube by applying the adhesive solution through a nozzle into the overlap seam.

In FIG. 5, an alternative for the course of the processes of shaping the tube and gluing of the mutually overlapping edge regions can be seen. The web 42 drawn off a wound roll 28 passes through a forming template 41, shown in section in FIG. 5a, and an overlapping aid 44. The adhesive solution 43 is then fed into the overlap region by the nozzle body 45. A pump 53 delivers the adhesive solution 43 from a stock vessel 54 for the adhesive solution. The web 42, now in the form of a tube, is glued while passing through the support tube 21, shown diagrammatically, with a contact sleeve 19. The tube formed is wound up for storage on a roll which is not shown.

Figure 6:
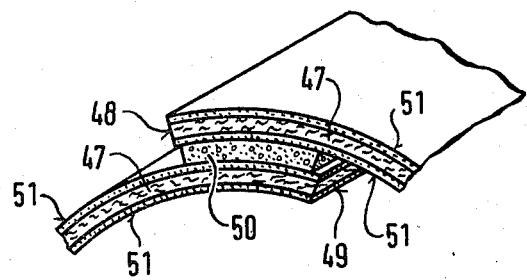
FIG. 6 is a perspective, cross-sectional view of the bonding seam of the tube with mutually overlapping edge zones of the web material.

In FIG. 6, the edges 48 and 49 of the web 47 are glued to one another with an overlap, the adhesive layer 50 being located between the overlapping regions. The anchoring layers 51 thereof are shown on the web surface.

Figure 7:
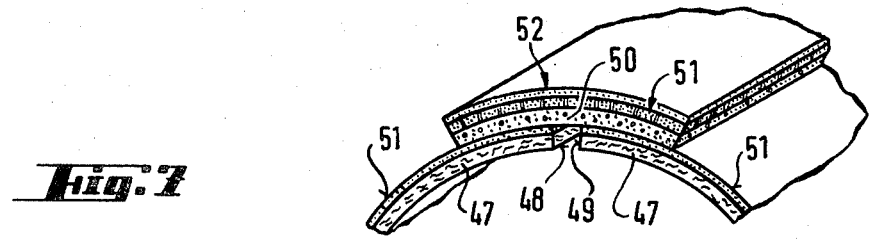
FIG. 7 is a perspective, cross-sectional view showing the bonding seam of the tube with a film strip.

In FIG. 7, the edges 48 and 49 of the web 47 abut and are joined by a film strip 52, covering both edges, via an adhesive layer 50 and an anchoring layer 51.

What is claimed is:

1. A tubular casing suitable for foodstuffs, comprising: a rectangular web of film, which is curved around its longitudinal axis and having its longitudinal edge regions joined by a glued seam to form a tubular casing, the tubular casing being comprised of cellulose or fiber-reinforced cellulose and having at least in the region of the glued seam an adhesive layer which contains a substantially water-insoluble cationic resin for joining the longitudinal edges, and wherein the tubular casing contains, in the region of the glued seam, a smoke-permeable adhesive layer of a room temperature-cured water-insoluble condensation product of a polyamide-polyamine, or an aliphatic polyamine or a polyamide with a bifunctional halohydrin or a halohydrin derivative.

2. A tubular casing as claimed in claim 1, comprising fiber-reinforced cellulose and further comprising a smoke-permeable adhesion-promoting layer on its inside and/or outside.

3. A tubular casing as claimed in claim 1 or 2, wherein regions close to said longitudinal edges are glued together with an overlap, and the adhesive-containing layer is located between the mutually overlapping regions.

4. A tubular casing as claimed in claim 1 or 2, wherein said longitudinal edges abut and are joined by a smoke-permeable film strip, running parallel to the longitudinal axis and covering both regions close to said edges, and wherein the adhesive-containing layer is located between the film strip and the regions close to the edges.

5. A tubular casing as claimed in claim 3, further comprising a smoke-permeable film strip running parallel to the longitudinal axis and being located between the overlapping regions, and wherein adhesive layers are located between the film strip and each of the overlapping regions.

6. A tubular casing as claimed in claim 2, wherein the smoke-permeable adhesion-promoting layer comprises a cured cationic resin selected from a urea/aldehyde, melamine/aldehyde or phenol/aldehyde resin or a condensation product of a polyamide-polyamine, aliphatic polyamine or polyamide with a bifunctional halohydrin or a halohydrin derivative.

7. A tubular casing as claimed in claim 1, which is shirred and wherein the gluing region is arranged helically around the longitudinal axis of the shirred tubular casing.

8. A tubular casing as claimed in claim 1, further comprising, on its inside, a coating which improves the ease of peeling the casing from a material filled inside of the casing.

* * * * *